(No Model.)

H. A. OLMSTED.
Gang Plow.

No. 230,192.          Patented July 20, 1880.

Witnesses
Geo. H. Strong
Frank J. Brooks

Inventor
Henry A. Olmstead
By Dewey & Co.
Attys

UNITED STATES PATENT OFFICE.

HENRY A. OLMSTED, OF OAKLAND, CALIFORNIA.

GANG-PLOW.

SPECIFICATION forming part of Letters Patent No. 230,192, dated July 20, 1880.

Application filed May 11, 1880. (No model.)

*To all whom it may concern:*

Be it known that I, HENRY A. OLMSTED, of Oakland, county of Alameda, and State of California, have invented an Improved Gang-Plow; and I hereby declare the following to be a full, clear, and exact description thereof.

My invention consists in a means of adjusting the cut of the plows and holding them down, and in certain details of construction, which are more fully illustrated in the accompanying drawings, in which—

Figure 1:
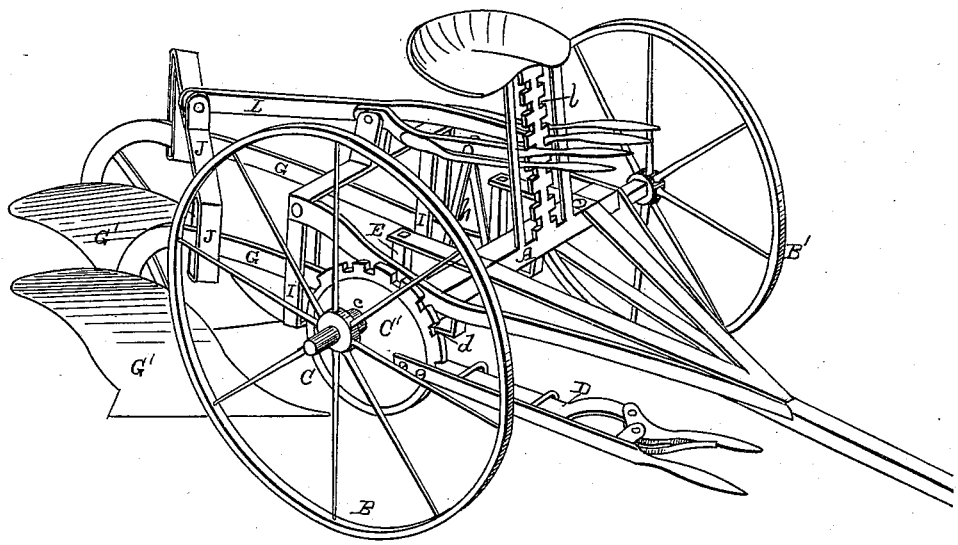
Figure 2:
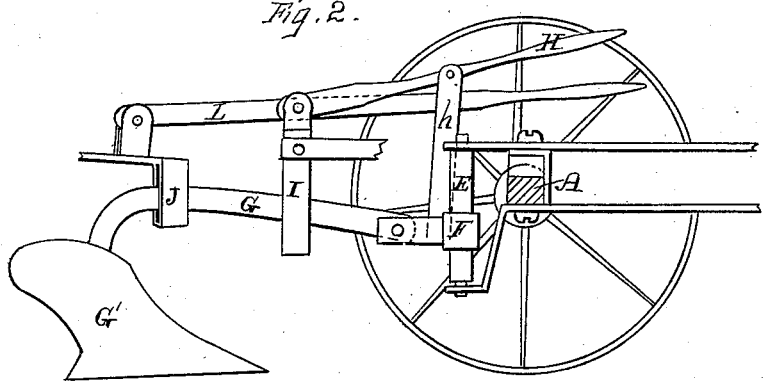
Figure 3:
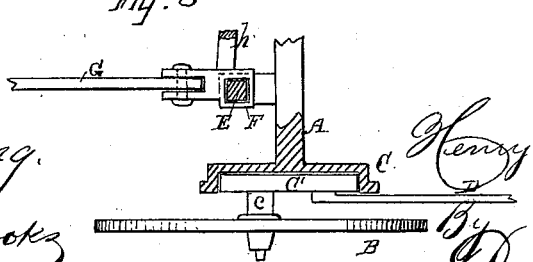

Figure 1 is a perspective view of my plow. Figs. 2 and 3 are sections showing the construction of the same.

The frame of the plow is mounted on an axle, A, provided with wheels B B', one of which is of larger diameter than the other, as shown. On that end of the axle where the large wheel is placed is a disk, C, which is fixed to the axle, and within which is fitted another disk, C', having a spindle, c, on which the large wheel B revolves.

Fixed to the outer disk, C', is a lever, D, for rotating said disk, this lever having a spring-pawl for engaging with ratchets d on the periphery of the fixed disk.

By revolving the outer disk carrying the wheel-spindle the bearing of the wheel is raised or lowered with relation to the frame, so as to keep the plow level at all times.

Over the frame of the plow are placed upright guides E, in which move slides F, and to these rollers are pivoted the plow-beams G, as shown. Bars *h* connect the slides F with a lever, H, so that as the lever is raised or lowered the slides carrying the plow-beams are elevated or depressed.

The plow-beams pass through slotted guide-bars I in the frame and through the guides J, which guides are connected as shown, and provided with an operating-lever, L. This operating-lever has a spring-pawl for engaging with the ratchets *l* on the standard of the driver's seat.

The guides J, through which the beams G, carrying the plows G', pass, allow a certain freedom of motion to the plow, while at the same time they control the plows by means of the levers.

By having the plow-beams hinged to the slides on the frame these beams are drawn along much more freely and with less draft than when the beams are rigid. The independent plows can follow the irregularities of the surface, and the gang of plows act therefore in as thorough a manner as a single plow drawn by horses where there are no wheels connected with it.

When I wish to lift the plows from the ground I draw up the lever H, which draws up the slides on the guides, these slides thus raising the ends of the plow-beams simultaneously. I then depress the other lever, L, which raises the guides J, and the plows are entirely lifted from the ground.

Ordinarily in gang-plows with rigid beams, when they are lifted out of the ground, the heels of the plows are apt to drag on the ground. This cannot occur in my plows, since the raising of the loose plow-beams elevates the points of the plows and the elevation of the guides lifts the rear ends. The plows are therefore completely lifted from the ground.

In hard ground in gang-plows with rigid beams the plows are apt to lift up. I prevent this by means of the guides with their lever. In this kind of ground I raise the lever, which forces the guides down on the rear ends of the beams, and this holds the plows down firmly to their work, the weight of driver and machine then being thrown on the plows.

By having the inner ends of the beams adjustable by pivoting them to the slides moving in the guides and connecting a lever to said slides, the depth of cut of the plows is regulated. The plows must follow in line with the forward ends of their beams at all times, and, the position of these forward ends being adjustable, the plows themselves are readily adjustable.

The plows run entirely independent and separate from each other, and it is possible for each one of them to work up and down from the end of the beam, so the draft is much lighter than where rigid beams are provided.

In those gang-plows in common use the method employed for raising or lowering them with relation to the ground is to have a movable crank-axle, which has a tendency to cant the plows themselves when the cranks are in certain positions.

In my plow the axle is rigidly secured to the frame, and the large wheel, when in the furrow, has its spindle raised by the revolving disk, so as to bring the frame and plow level.

Each of the plows hangs loose and independent, and while they are lifted together, held down together, and have their depth of cut simultaneously regulated, each has an independent motion as well, so that one can go over a mound or ridge and not affect the other. Each one having its beam independently hinged or swiveled to the slides on the frame has its independent motion with relation to said frame.

The adjustment of the plows as described is all regulated from the driver's seat, the two levers coming in front of said seat, as shown.

Having thus described my invention, what I claim as new, and desire to secure by Letters Patent, is—

In combination with the plow-beams G, carrying the plows G', said beams being hinged, pivoted, or otherwise loosely connected to the wheeled frame, the slides F, guides E, and lever H, and the rear guides, J, and lever L, whereby both forward and rear ends of the plows are correspondingly elevated from the ground, substantially as and for the purpose herein described.

In witness whereof I have hereunto set my hand.

HENRY A. OLMSTED.

Witnesses:
CHAS. G. YALE,
S. H. NOURSE.